United States Patent
Augustin

[15] 3,692,317
[45] Sept. 19, 1972

[54] SLIDE RING SEAL
[72] Inventor: Gustav Augustin, Heilbronn, Germany
[73] Assignee: Kupfer-Asbest-Co. Gustav Bach, Heilbronn, Germany
[22] Filed: Sept. 24, 1970
[21] Appl. No.: 74,982

[30] Foreign Application Priority Data
Sept. 25, 1969 Germany..........P 19 48 502.0
Sept. 25, 1969 Germany..........P 19 48 501.9
Sept. 25, 1969 Germany..........P 19 48 499.2

[52] U.S. Cl..................................................277/81
[51] Int. Cl. ..............................................F16j 15/34
[58] Field of Search..........................277/81–96, 38, 277/39, 40; 251/DIG. 1; 285/DIG. 19

[56] References Cited
UNITED STATES PATENTS
2,561,132   7/1951   Payne.........................277/81
3,086,782   4/1963   Peickii et al.................277/92
3,524,654   8/1970   Hasselbacher et al...277/38 X

*Primary Examiner*—William F. O'Dea
*Assistant Examiner*—Robert I. Smith
*Attorney*—Walter Becker

[57] ABSTRACT

A slide ring seal which includes housing means having an inner first substantially cylindrical wall surface and a slide ring coaxially arranged with regard to said first cylindrical wall surface and being radially spaced therefrom while that peripheral wall surface of said slide ring which faces toward said first cylindrical wall surface is designed as a second cylindrical surface, elastic O-ring means being interposed under preload between said first and second wall surfaces and being adapted in response to an axial relative movement between said housing means and said slide ring to roll on one of said cylindrical wall surfaces so as to be torsion loaded for maintaining the slide ring in sealing engagement with a surface engaged by said slide ring when said O-ring means is under torsion load.

12 Claims, 9 Drawing Figures

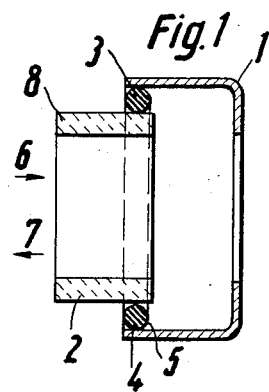
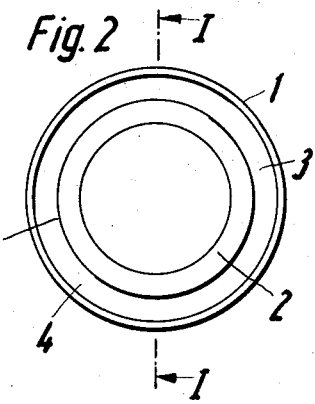
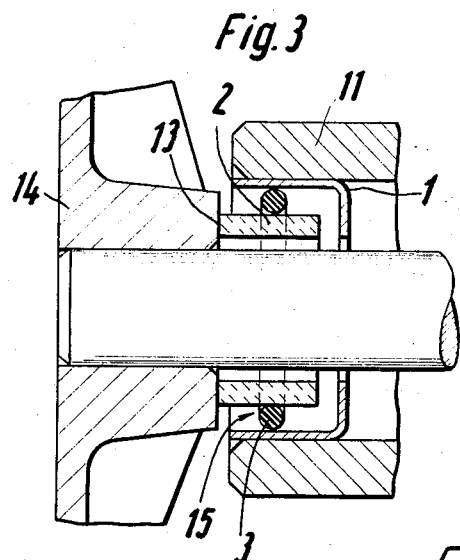
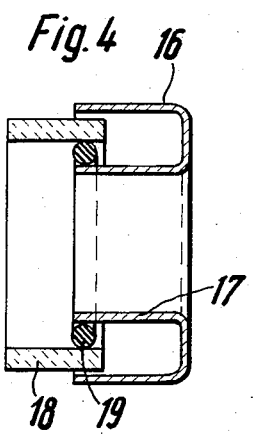
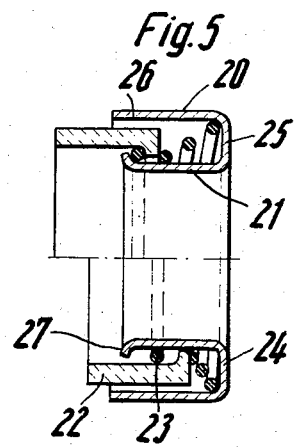

Inventor:
Gustav Augustin

SLIDE RING SEAL

The present invention relates to a slide ring seal with a housing and with a slide ring coaxially arranged in said housing and also with an elastic O-ring which is located between the housing and the slide ring and for which while under radial preload rests on one hand against the housing and on the other hand against the sliding ring. Those surfaces of the slide ring and the housing which are engaged by the O-ring are cylindrical and have such a width (when measured in axial direction) that the O-ring during an axial relative movement between slide ring and housing can roll on the circumference of its cross-sectional surface. The slide ring seal is furthermore provided with means for producing an axial effective sealing force which holds the slide ring with one of its end faces pressed against a sealing surface extending transverse to the axis of the slide ring.

With a heretofore known slide ring seal of the above mentioned type, the slide ring which rotates in a groove has an end face in engagement with a ring which is stationarily arranged in the housing and which forms a permanent magnet and which instead of a pressure spring furnishes the necessary pressing forces at the sealing areas. In this instance, the O-ring is located in a groove which is cut into the bore wall of the sliding ring. The axial width of said groove is so dimensioned that the O-ring is adapted during axial movements of the shaft to roll along the bottom of the groove and along the mantle surface of the shaft about its cross-sectional axis when the shaft is moved in axial direction out of its intermediate position of operation in which the O-ring in relaxed condition is arranged in the center of the groove while being evenly spaced from the groove walls. The return force which increases with increasing rolling angle of the O-ring is, with this heretofore known arrangement, used for elastically absorbing any shock-like loads which may occur during such axial displacements of the shaft, and is furthermore used to prevent that the force of attraction of the permanent magnet is exceeded by axial shocks during such displacing movements and furthermore to prevent that the sealing effect is harmfully affected. The magnetic force should therefore always remain higher than the return force of the O-ring which rolls off during a deviation.

According to another heretofore known slide ring seal of the above mentioned type according to which the slide ring is under the force of a helical spring, the O-ring may, from its normal position, roll in both directions on the sleeve and the slide ring when the sleeve and slide ring are displaced relative to each other, whereby the sealing effect between sleeve and slide ring will not be affected.

With the two above mentioned heretofore known slide ring seals, therefore, the mechanical pressing force for obtaining the sealing effect of the slide ring is produced by separate mechanical means, namely, the magnetic force or the spring thrust, and the said devices do not provide that this mechanical pressing or sealing force is produced primarily by torsion stresses of the O-ring between the cylindrical surfaces.

On the other hand, it is known to produce the pressing force against slide rings in sealing arrangements exclusively by means of O-rings, in other words without separate mechanical devices such as springs, and the like. IN such an instance, the pressing force is obtained primarily by the conical design of the engaging surfaces for the O-rings and thereby by a compression of the O-rings.

These last mentioned heretofore known arrangements have the drawback that the engaging surfaces for the O-rings have to be shaped conically, and such shaping and fitting of the engaging surfaces to each other over the axial length of the elements is rather expensive. A further disadvantage of this last mentioned arrangement consists in that the spring stroke of the slide ring as inherent to the conical engaging surfaces is rather limited.

It is, therefore, an object of the present invention to provide a slide ring seal which will be free from the drawbacks outlined above and which for purposes of obtaining the sealing force no longer requires magnets, springs, or the like, and which likewise does not require conical surfaces as engaging surfaces for the O-ring.

It is still another object of this invention to provide a slid ring system, as set forth in the preceding paragraph, which in addition to furnishing a soft spring elastic sealing force will also yield a sufficiently large spring stroke. These and other objects and advantages of the invention will appear more clearly from the following specification in connection with the accompanying drawings, in which:

FIG. 1 is an axial longitudinal section through a slide ring seal according to the invention.

FIG. 2 is an axial view of the slide ring of FIG. 1, as seen in the direction of the arrow 6.

FIG. 3 shows a modified slide ring seal according to the invention, assembled in a pump, only a portion of which is shown.

FIG. 4 illustrates in axial longitudinal section still another slide ring seal according to the invention with an inwardly extending housing neck.

FIG. 5 shows a further modified seal according to the invention.

Figure 6:
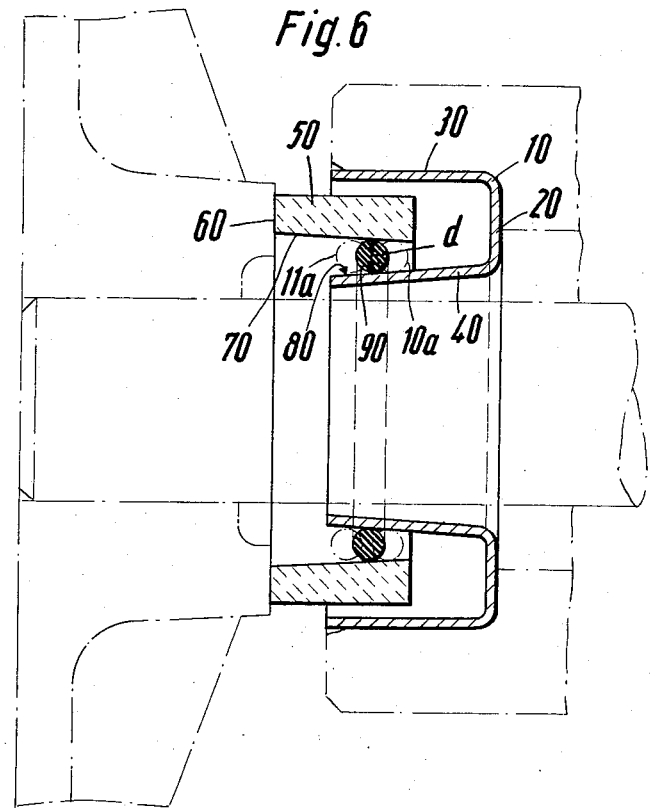
FIG. 6 represents an axial longitudinal section through still another modification of a slide ring seal according to the invention.

The slide ring seal according to the present invention is characterized primarily in that for producing the sealing force, the elastic deformation due to the torsion stress of the O-ring is made use of while the O-ring in installed condition of the seal is so located between its engaging surfaces that it is torsion stressed.

For subjecting the slide ring to pressure, thus with the solution according to the present invention the torsion stress of the O-ring between cylindrical surfaces is made use of while in addition to the sealing force furnished by the torsion stress of the O-ring, the pressure of the medium to be sealed can act upon the slide ring.

Particularly favorable conditions are obtained when the O-ring in condition of operation is, by about 90°, turned about its cross-sectional axis with regard to its relaxed position. When installing the seal according to the invention into a pump or when assembling the pump, an axial relative movement occurs between the slide ring and the housing during which relative movement the seal is axially compressed. This brings about that the O-ring rolls between its engaging surface with the housing and its oppositely located engaging surface with the slide ring, while said O-ring carries out a rotary movement about its cross-sectional axis and consequently becomes a coil spring because a portion of the elastic O-ring will be stretched during this turning movement, namely, that portion which, in undistorted condition is located inwardly, whereas that portion which in undistorted condition is located in the vicinity of its maximum diameter, will be upset. By taking advantage of the elasticity of the material of which the O-ring is made, the O-ring will have the tendency to return to its unstressed starting position. Following the installation of the seal in the pump, the O-ring remains in itself under a preload and presses the slide ring against that engaging surface which is located opposite thereto.

Thus, with the slide ring seal according to the invention, heretofore necessary pressing members for the slide ring, such as helical springs, magnetic forces, etc., become superfluous, and furthermore it is no longer necessary to give the engaging surfaces for the O-ring a special, for instance, conical shape for producing a pressing force derived from the O-ring. However, it is also possible while maintaining the principle of the invention, in addition to the sealing force produced by the torsion stress of the O-ring to provide a customary spring for aiding said sealing force and/or to make the pressure of the medium to be sealed effective. This will be expedient, particularly when with a slide ring seal only limited constructive space is available so that no O-ring with a cross section or mass necessary for generating the entire pressing force can be installed. Generally, it is also possible according to the seal of the present invention and while employing sealing rings of relatively small cross section to completely do without the otherwise customary coaxial springs for generating the pressing pressure and instead to employ the O-ring directly for producing the necessary pressing pressure for the slide ring. During its installation, the O-ring is deformed cross sectionwise and must in addition to its own tolerances provided for the cross-sectional diameter also absorb those diameter tolerances which are permitted for the zones serving as engaging surface for the O-ring. This requirement can be met by the O-ring while maintaining a percentage deformation sufficient for a good function, particularly when its cross-sectional diameter does not drop below a certain minimum thickness even though this thickness is substantially less than with the heretofore known slide ring sealing arrangements.

It is also an object of this invention so to design the slide ring seal of the above mentioned general type that commercially available O-rings with thin cross section may be employed and that regardless of the tolerances provided for the manufacture of the sliding ring, of the housing, and of the O-ring, the required deformation of the O-ring will be obtained by squeezing or upsetting. Such deformation is necessary in order to enable the O-ring to exert the necessary sealing effect and also to permit the O-ring to roll but not slide on its engaging surface while assuring the necessary axial movability. Therefore, the O-ring must, in its operational position, be pressed sufficiently strongly between its engaging surfaces. In order to assure this, it is provided according to the invention that the zones on the slide ring and on the housing which serve as engaging surfaces for the O-ring form mantle surfaces of one of two cones which are located coaxially with regard to each other but have their points point away from each other. The position of the cone tips which point in opposite directions with regard to each other brings about that progressing in the same axial direction, the diameter of the inner engaging surface, i.e., the engaging surface closer to the sealing axis, becomes greater while simultaneously the diameter of the outer engaging surface of the O-ring becomes shorter. As a result thereof, a conical chamber forms between the separated ring and the housing into which chamber the O-ring may in axial direction be pressed to such an extent that it has the desired cross-sectional deformation. This cross-sectional deformation is also maintained during an axial relative movement of the slide ring with regard to the housing, because with this movement the O-ring rolls and turns about its cross-sectional axis. The change in the cross-sectional diameter which results during this rotary movement from the change in the diameter of the ring is negligible. This change, however, may according to a further development of the invention be absorbed by selecting the cone angle $\alpha$ of the outer engaging surface for the O-ring as a smaller angle that the conical angle of the inner engaging surface.

The design according to the invention may in particular also advantageously be employed when the employed inner sealing element is acted upon by two different fluids. This instance occurs, for instance, when two liquids are to be separated from each other or when on one side of the seal the liquid to be sealed off, for instance, water is located whereas on the other side there is located the lubricating oil or grease for greasing a bearing. In such instances, the intended sealing effect is satisfactory only when the material of which the inner sealing element is made has a sufficient resistance against the two liquids. If this is not the case, it can be brought about by the invention in a simple manner when in conformity with the invention two O-rings are arranged one behind the other in the direction of the intended sealing effect. It will then be possible without difficulties according to a further development of the invention to respectively produce the O-rings of different material while selecting the material of said O-rings so that they are resistant to the respective liquids to be sealed off. Thus, for instance, one O-ring may be produced of ethylene propylene rubber material and will then have a particularly high resistance relative to water, whereas the other O-ring may be made of nitrile rubber which is particularly resistant against oil.

Particularly simple conditions with regard to the construction are obtained, if according to a further suggestion in conformity with the present invention O- rings are employed which respectively have the same inner and outer diameters and are arranged serially one behind the other while being offset. According to one embodiment of the invention the housing may in customary manner have an axial longitudinal section of U-shaped contour and a cylindrical outer wall within which there is provided a tubular neck which is coaxial with the outer wall. In this instance, the neck expediently forms one piece with the outer wall and is connected thereto through a bottom member. In such an instance, the slide ring may in a manner known per se be so arranged that it extends at least over a portion of its axial length into the space between the outer wall and the neck, and more specifically, with its end zone which serves as sealing surface and faces away from the end face. With such an arrangement the seal according to the invention is particularly effective when one of the two O-rings is arranged between the neck and the bore wall of the slide ring extending over the neck, while the other O-ring is arranged between the outer circumferential surface of the slide ring and the inner wall of the housing.

The slide ring seal according to the invention has over heretofore known slide ring seals the additional advantage that it is extremely simple in construction, composed of a few parts only and therefore is inexpensive to manufacture and does not need much servicing. The slide ring is axially movable to a very great extent and, therefore, is able to absorb major tumbling movements.

Referring now to the drawings in detail, the slide ring seal illustrated therein comprises an annular housing 1 by means of which it may be connected in a pump housing, not illustrated, and furthermore comprises an annular slide ring 2 which is movable in the housing 1 in axial direction. The slide ring furthermore comprises an O-ring 3 which is located between said two parts and serves as sealing element and torsion spring. This O-ring is, in the direction of the sealing axis, free in both directions. The outer circumferential surface of said O-ring engages the inner wall surface of the housing at point 4, whereas the inner circumferential surface of the O-ring engages the outer wall surface of the slide ring at point 5. If now the slide ring moves axially in the direction of the arrow 6, the O-ring rolls in the same direction by half the distance over which the slide ring moves. In this connection, the O-ring is turned about its cross-sectional axis while that portion engaging the housing is upset and the other portion engaging the slide ring is stretched. The thus obtained stresses result in a returning force acting in the direction of the arrow 7 by which the slide ring is at its end face 8 pressed against the engaging or butting face therefore. The torsion stress occuring during the elastic deformation of the O-ring is made use of for producing the sealing force while the O-ring in built-in condition of the seal is under torsion stresses located between its engaging surfaces. Merely by way of example, and with reference to FIG. 1, with a diameter of the bore of housing 1 (the inner diameter) of 32 millimeters, the outer diameter of the slide ring 2 may be 25 millimeters, and in this instance the O-ring 3 when under no load may have an outer diameter of 32 millimeters and an inner diameter of 24 millimeters.

FIG. 3 illustrates the slide ring seal according to FIGS. 1 and 2 in operative position. The slide ring seal has its housing 1 connected to a pump element 11, for instance, by pressing the housing 1 thereinto. The slide ring 2 has its end face 13 in engagement with a vane wheel 14, which pertains to the non-illustrated pump, and seals the same at this area. Between the sealing housing 1 and the slide ring 2 there is built in the O-ring 3 in a manner according to the present invention. However, in contrast to FIG. 1, the O-ring has been turned by approximately 90° about its transverse axis, which means is torsion stressed and thereby produces the pressing force at which the slide ring is pressed against the vane wheel. Simultaneously, the O-ring 3 also prevents the passage of the medium to be sealed (indicated by the arrow 15) through the seal and conveys to the stationary sealing housing 1 the torque created by the friction at the sealing surface, namely, the end face of the slide ring and the end face 13. Since with the seal design illustrated in FIG. 3 the fluid pressure acts upon the O-ring in a direction opposite to the pressing force, this seal is suitable only for sealing pressureless pumps as for instance, rotary pumps.

In contrast thereto, the sealing design illustrated in FIG. 4 is particularly suitable for the sealing of pumps with higher pressures because in this instance the fluid pressure will act also upon the return side of the slide ring and will thus increase the pressure produced by the O-ring. The seal according to FIG. 4 comprises a housing 16 which has a central cylindrical neck 17 extending inwardly from the bottom. Between the neck and the slide ring 18 there is an O-ring 19 according to the invention installed in such a way that during an axial relative movement between slide ring and housing said O-ring 19 will be able to roll on the circumference of its cross-sectional surfaces indicated by cross shading and during this rolling movement can clamp itself.

FIG. 5 shows a slide ring seal with an O-ring 23 installed in conformity with the invention. The upper section of FIG. 5 shows the slide ring seal prior to its installation whereas the lower section of FIG. 5 shows the slide ring seal in operative position. Frequently, it occurs that little space is available for a slide ring seal in radial direction. This is particularly the case when instead of stuffing box packings, slide ring seals are employed. As a result thereof, a very small sealing cross section is obtained in radial direction, which sealing cross section is too small to mount an O-ring with the cross section or mass necessary for producing the pressing force. In such an instance, an additional pressure spring is necessary or a second non-illustrated O-ring.

The slide ring according to FIG. 5 comprises a housing 20 with an inner cylindrical neck 21, with a slide ring 22 and with an O-ring 23 according to the invention arranged between neck 21 and ring 22. This O-ring has a relatively small cross section and while being able to take care of the inner sealing is not able to furnish the full pressing force required by the slide ring for pressing against its counter surface. The remainder of the pressing force of spring 24 is furnished by a further, not illustrated O-ring, of the same arrangement and effect. In order to prevent that in non-installed condition of the seal, the slide ring and O-ring can be removed from the housing, the front portion of the housing neck 24 is folded over, after assembly of the seal in the housing.

The design according to the invention of the engaging surfaces for the O-ring which form surfaces of rotation and the possibility created in this connection of an axial rolling of the O-ring may also be employed with such slide rings which are slipped onto a rotating shaft and are to be rotated with the latter while engaging a resting counter surface.

The slide ring seal according to FIG. 6 is intended for use in a non-illustrated pump and has a housing 10 with U-shaped cross section which housing is produced by deep drawing from a sheet metal plate. Said housing has a radially extending bottom 20 and an outer cylindrical mantle part 30 to which the seal in the pump housing can be connected. The housing also has an inwardly extending neck 40. A slide ring 50 extends into the annular chamber between the mantle part 30 and the neck 40. This slide ring 50 has to be movably guided in axial direction, inasmuch as its plane end face 60 is pressed against a non-illustrated contact surface for sealing the same. The bore wall 70 of the slide ring 50 serves as outer engaging surface for an O-ring 90 arranged between the slide ring 50 and the neck 40 of housing 10. Ring 90, when in non-loaded condition, has a circular cross-sectional surface indicated in the drawing by cross hatching. The bore wall 70 forms a mantle surface of a cone which is co-axial with the sealing axis A,A. The cone angle $\gamma$ of said cone which, for the sake of simplicity, is not shown in the drawing has at the cone tip the value $\gamma=2\alpha=4°$ while the angle of inclination $\alpha$ of the bore wall 70 is approximately 2°.

The circumferential surface of the neck 40, which circumferential surface serves as inner engaging surface 80 of the O-ring, is likewise conical, but has a somewhat greater angle of inclination $\beta$ of approximately 3°. While the cone pertaining to the outer engaging surface 70 has its tip located at the right-hand side of the housing 10 on the extended sealing axis A,A, the cone tip of the cone pertaining to the inner engaging surface 80 is located on the left-hand side of the end face 60 of the slide ring 50 and thus points in the opposite direction.

The O-ring 90 is intended to bring about the inner sealing as well as the pressing force required for the slide ring 50. To this end it is necessary that the O-ring will, with its outer circumferential surface, engage the slide ring and with its inner circumferential surface engage the housing at a certain pressure which is produced by the deformation of its cross section. This cross-sectional deformation occurs when the O-ring under pressure is, in axial direction, inserted into the tapering gap between the neck 40 and the slide ring 50 while the diameter tolerances admissible for the bore 70 of the slide ring 50 of the circumferential surface 80 pertaining to the housing neck 40 and the cross-sectional diameter d of the O-ring 90 cancel each other. Depending on the width of the gap resulting from the tolerances and the cross-sectional diameter d of the O-ring, the latter will be located at a lower point, for instance, at the point 10a or less deep, for instance, at the point 11a in the gap.

With a sealing size determined, for instance, for a shaft diameter of 15 millimeters and with an angle of inclination $\alpha$ and $\beta$ of the two cones from 2° to 3°, all tolerances are taken care of with a deviation in depth of from ± 1 millimeter for the installation of the O-ring.

With an axial movement of the slide ring in the illustrated direction of the arrow, the O-ring 90 rolls on the conical housing surface 80 and thus undergoes an increase as to the diameter of its bore. Simultaneously, however, the O-ring also rolls by the same distance on the bore wall 70 of slide ring 50 but in opposite direction toward the end face 60 of the slide ring while its outer diameter will increase in conformity with the conical mantle opening in this direction, so that the radial distance of the two points of contact of the O-ring and thus also the percentage-wise cross-sectional deformation is retained. The change of the O-ring diameter occuring in practice with this axial movement, and thus also the cross-sectional change inherent thereto is so small that it can be considered negligible.

For purposes of producing the necessary pressing force at which the slide ring 50 is in a direction opposite to the direction of the arrow under load held against its engaging surface, it is provided with the illustrated embodiment that the slide ring 50 is in the illustrated direction of the arrow pressed by the engaging surface into its position of operation to such a depth that with this movement the O-ring 90 rolls on the circumference of its cross-sectional surface over an angle from about 30° to approximately 180° on its engaging surface and thus is, in the above mentioned manner, turned about its cross-sectional axis. During this rotation, its zone which is located in the region of the maximum O-ring outer diameter is turned toward the sealing axis and is upset, whereas that zone which is located in the region of the bore diameter of the O-ring is displaced outwardly or away from the sealing axis A,A whereby it is stretched. In this way, the O-ring is tensioned in itself and then in view of its elastic forces inherent to the material will have the tendency to roll back into the starting position and thus to press the slide ring 50 in a direction counter to the direction of the arrow against its engaging surface.

Figure 7:
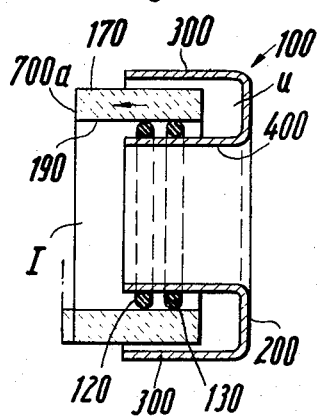
FIG. 7 shows a further embodiment of a slide ring according to the invention, in which the O-rings for producing the pressing force onto the slide ring are located in parallel arrangement one behind the other on a neck-shaped portion of the housing.
Figure 8:
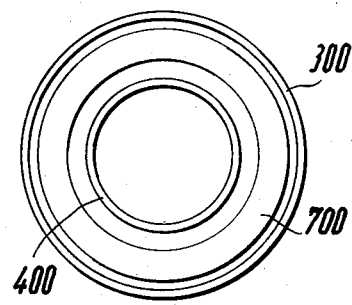
FIG. 8 is an end view of the slide ring seal according to FIG. 7, as seen in the direction of the arrow A of FIG. 7.
Figure 9:
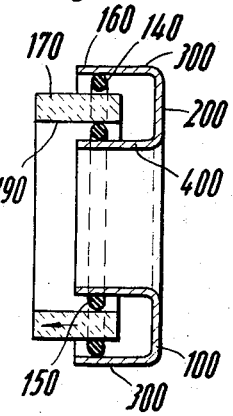
FIG. 9 is an axial longitudinal section of still another slide ring seal according to the invention which comprises two O-rings of different sizes which are arranged coaxially with regard to each other and have the slide ring located therebetween.

With the embodiments illustrated in FIGS. 7, 8 and 9, there is provided a housing 100 which according to the axial longitudinal section illustrated in FIGS. 7 and 9 has a U-shaped contour and has three parts, namely a bottom member 200 extending in radial direction, a cylindrical outer wall 300, and a tubular neck 400 which is located inside of the outer wall and is coaxial to said outer wall. Neck 400 is through the intervention of the bottom member 200 connected to the outer wall 300 so as to form a single integral piece therewith. Slide ring 170 movable in axial direction extends into the annular chamber defined by the outer wall 300 and the neck 400. Slide ring 170 has its radial end face 700 A pressed against a non-illustrated engaging surface where the intended sealing effect is realized.

With the embodiment illustrated in FIG. 7, two O-rings 120 and 130 of different elastic material are provided which form the inner sealing elements and serve for separating the inner chamber I from the outer chamber U of the seal. Assuming that the inner chamber I is filled with an oil serving as lubricant, the O-ring 120 subjected to the pressure of said oil is made of nitrile rubber, whereas the right-hand second O-ring 130, when said slide ring seal is being used in a water pump, is subjected from the outside to the pressure of the water to be conveyed and therefore is made advantageously of ethylene propylene rubber. In this way the O-rings can be designed particularly resistant to the medium acting thereupon.

With the slide ring seal illustrated in FIG. 7, the two O-rings 120 and 130 respectively made of a different elastic material in conformity with the respective liquid to be sealed thereby, are at a slight axial spaced arrangement from each other arranged adjacent to each other in planes perpendicular to the seal axis. The two O-rings 120 and 130 have relatively thin cross-sectional surfaces, indicated in the drawing by a cross shading, and have their outer circumference in engagement with the slide ring 170 under radial stress, the bore wall of said slide ring being cylindrical throughout. In order, also without the employment of a pressure spring to be able to press the slide ring 170 or, more specifically, its end face 700 against a non-illustrated engaging surface, it is provided that the two O-rings 120 and 130 will be in a non-loaded condition when the slide ring 170 occupies a position which in the lower section of FIG. 7 is indicated by dash lines, while during the insertion of the slide ring 170 into the operative position shown in full lines said O-rings and, more specifically, the circumference of their cross-sectional surfaces will roll on the cylindrical bore wall 190 and the likewise cylindrical circumferential surface of the housing neck 400 by about 90°. During this rolling movement, the said O-rings turn about their cross-sectional axis while that portion thereof which in non-loaded condition is located inwardly and engages the neck 400 will with increasing turning movement be stretched whereas its outer part which in non-loaded condition is located in the vicinity of the largest diameter is upset. Thus, after an axial deviation of the slide ring relative to the housing which deviation is brought about by a pressing of the slide ring seal against a non-illustrated engaging surface, a force becomes effective which has the tendency to press the slide ring 170 in the direction indicated by the arrow against its engaging surface because the O-rings 120 and 130 will due to the elastic forces inherent to the respective material of which the O-rings are made have the tendency to regain their original non-deformed starting position. In order to assure the axial moving ability and rolling possibility of the O-rings as necessary for such torsion stresses, care has to be taken that those zones which serve as engaging surfaces on the bore wall 190 and on the outer circumferential surface of neck 400 extend over an axial length which amounts to at least 1.5 times the cross-sectional diameter of the O-rings.

With the embodiment of FIG. 9, there are likewise provided two O-rings 140 and 150 which in non-loaded condition have circular cross-sections. In contrast to the above described embodiments, however, the O-rings have different inner and outer diameters. They are coaxially arranged with regard to each other in a common cross-sectional plane in such a way that the outer O-ring 140 is arranged between the circumferencital surface of the slide ring 170 and the inner surface of the outer wall 300, whereas the inwardly located O-ring 150 is under slight radial preload and is located between the bore 190 of the slide ring 170 and the likewise cylindrically designed circumferential surface of the housing neck 400. Similar to the above described embodiment, also in this instance a torsion stress is produced in this sealing ring by an axial insertion of the slide ring and a simultaneous rolling movement of the two O-rings 140 and 150. This torsion stress is also without the employment of an additional pressure spring producing the pressing force for the slide ring as it is required, said pressing force being indicated by an arrow. The arrangement of the two O-rings in a common cross-sectional plane will for the embodiment of FIG. 9 bring about a particularly short axial length, and due to the fact that the material of the O-rings is selected in conformity with the media to be sealed, a particularly long life of the slide ring seal will be assured.

It is, of course, to be understood that the present invention is, by no means, limited to the particular showing in the drawing but also comprises any modifications within the scope of the appended claims.

What I claim is:

1. A slide ring seal which includes: housing means having an inner first substantially cylindrical wall surface free of any recess therein, a slide ring coaxially arranged with regard to said first cylindrical wall surface and being uniformly radially spaced therefrom, said slide ring having that peripheral surface thereof which faces toward said first cylindrical wall surface designed as a second cylindrical wall surface, elastic O-ring means having a circular cross section interposed under preload between said first and second wall surfaces as the sole axial moving force for said ring, said housing means and said slide ring being axially movable relative to each other to thereby cause said O-ring means exclusively to roll on said cylindrical wall surfaces about the axis of its cross section so as to torsion load said O-ring means while retaining its circular cross section, thereby causing said O-ring means to maintain said slide ring in sealing engagement with a surface to be engaged by said slide ring when said O-ring means is under torsion load.

2. A slide ring seal according to claim 1, in which the O-ring means when under torsion load has by approximately 90° over its non-loaded condition turned about the axis of its cross section.

3. A slide ring seal according to claim 1, in which said O-ring means comprises two O-rings arranged one behind the other.

4. A slide ring seal according to claim 3, in which said O-rings are respectively of oil resistant rubber and water resistant rubber.

5. A slide ring seal according to claim 1, in which said O-ring means comprises two O-rings which are offset with regard to each other in the axial direction of said slide ring seal.

6. A slide ring seal which includes: housing means having an inner first substantially cylindrical wall surface free of any recess therein, a slide ring coaxially arranged with regard to said first cylindrical wall surface and being uniformly radially spaced therefrom, said slide ring having that peripheral surface thereof which faces toward said first cylindrical wall surface designed as a second cylindrical wall surface, elastic O-ring means having a circular cross section interposed under preload between said first and second wall surface as the sole axial moving force for said ring, said housing means and said slide ring being axially movable relative to each other to thereby cause said O-ring means exclusively to roll on said cylindrical wall surfaces about the axis of its cross section so as to torsion load said O-ring means while retaining its circular cross section, thereby causing said O-ring means to maintain said slide ring in sealing engagement with a surface to be engaged by said slide ring when said O-ring means is under torsion load, said housing means defining an annular chamber having a U-shaped cross section and receiving therein at least a portion of said slide ring, said annular chamber being open toward one end face of said slide ring, and the outer surface of the inner wall of said annular chamber forming said first cylindrical wall surface.

7. A slide ring seal according to claim 6, in which the inner wall of said annular chamber of the housing means has its free end provided with a folded-over portion folded in the direction toward said slide ring for limiting the relative displacement stroke between said housing means and said slide ring.

8. A slide ring seal according to claim 6, in which the inner surface of the outer wall of said annular chamber is radially outwardly spaced from said slide ring, and in which additional O-ring means is arranged under preload between the inner surface of said outer wall of said annular chamber and the outer surface of said slide ring, said last mentioned inner and outer surfaces being substantially cylindrical and coaxial with regard to each other.

9. A slide ring seal which includes: housing means having an inner first substantially cylindrical wall surface free of any recess therein, a slide ring coaxially arranged with regard to said first cylindrical wall surface and being uniformly radially spaced therefrom, said slide ring having that peripheral surface thereof which faces toward said first cylindrical wall surface designed as a second cylindrical wall surface, elastic O-ring means having a circular cross section interposed under preload between said first and second wall surfaces as the sole axial moving force for said ring, said housing means and said slide ring being axially movable relative to each other to thereby cause said O-ring means exclusively to roll on said cylindrical wall surfaces about the axis of its cross section so as to torsion load said O-ring means while retaining its circular cross section, thereby causing said O-ring means to maintain said slide ring in sealing engagement with a surface to be engaged by said slide ring when said O-ring means is under torsion load, said first and second cylindrical wall surfaces respectively forming the mantle surfaces of two cones being arranged substantially coaxially with regard to each other but having the tips of said cones pointing in opposite directions with regard to each other.

10. A slide ring seal according to claim 9, in which the smaller angle of said conical angles is smaller by about one-third than the other conical angle.

11. A slide ring seal according to claim 9, in which the conical angle of that one of the first and second wall surfaces which forms the outer wall surface for engagement with the O-ring means being less than the conical angle of the other wall surface.

12. A slide ring seal which includes: housing means having an inner first substantially cylindrical wall surface free of any recess therein, a slide ring coaxially arranged with regard to said first cylindrical wall surface and being uniformly radially spaced therefrom, said slide ring having that peripheral surface thereof which faces toward said first cylindrical wall surface designed as a second cylindrical wall surface, elastic O-ring means having a circular cross section interposed under preload between said first and second wall surfaces as the sole axial moving force for said ring, said housing means and said slide ring being axially movable relative to each other to thereby cause said O-ring means exclusively to roll said cylindrical wall surfaces about the axis of its cross section so as to torsion load said O-ring means while retaining its circular cross section, thereby causing said O-ring means to maintain said slide ring in sealing engagement with a surface to be engaged by said slide ring when said O-ring means is under torsion load, said O-ring means comprising two O-rings arranged one behind the other, one of the two O-rings being of ethylenepropylene rubber material whereas the other O-ring being of nitrile rubber material.

* * * * *